US008657619B2

(12) United States Patent
Lin et al.

(10) Patent No.: US 8,657,619 B2
(45) Date of Patent: Feb. 25, 2014

(54) FIXING MECHANISM FOR FIXING A BOARD AND ELECTRONIC DEVICE THEREWITH

(75) Inventors: Li-Sheng Lin, New Taipei (TW); Wen-Chieh Cheng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 133 days.

(21) Appl. No.: 13/434,854

(22) Filed: Mar. 30, 2012

(65) Prior Publication Data

US 2013/0017718 A1 Jan. 17, 2013

(30) Foreign Application Priority Data

Jul. 12, 2011 (TW) .............................. 100124672 A

(51) Int. Cl.
*H01R 13/62* (2006.01)
(52) U.S. Cl.
USPC .......................................... 439/328; 439/326
(58) Field of Classification Search
USPC ................................................ 439/325–328
See application file for complete search history.

(56) References Cited

U.S. PATENT DOCUMENTS

| 7,134,895 | B1 * | 11/2006 | Choy et al. ................... 439/326 |
| 7,134,896 | B1 * | 11/2006 | Chen ............................. 439/326 |
| 7,241,159 | B1 * | 7/2007 | Chen ............................. 439/326 |
| 7,300,298 | B2 * | 11/2007 | Kameda ........................ 439/326 |
| 7,467,963 | B2 * | 12/2008 | Chen ............................. 439/328 |
| 7,470,136 | B2 * | 12/2008 | Yahiro et al. .................. 439/326 |
| 7,503,792 | B2 * | 3/2009 | Xiao ............................. 439/326 |
| 7,682,179 | B1 * | 3/2010 | Tsai .............................. 439/326 |
| 8,113,862 | B2 * | 2/2012 | Wei .............................. 439/326 |
| 8,422,242 | B2 * | 4/2013 | Lin .............................. 361/759 |

* cited by examiner

*Primary Examiner* — Thanh Tam Le
(74) *Attorney, Agent, or Firm* — Winston Hsu; Scott Margo

(57) ABSTRACT

A fixing mechanism includes a bottom plate, a base, an engaging component and a resilient component. The engaging component is installed on the base for engaging a side of a board. The engaging component includes a main body, a pivoting portion connected to an end of the main body and pivoted to the base, a hook portion connected to another end of the main body for hooking the side of the board, a handle portion connected to another end of the main body for driving the hook portion to separate from the side of the board, and a pin portion installed on a side of the main body. The resilient component sheathes with the pin portion for driving the engaging component to pivot relative to the base. An end of the resilient component contacts with the main body, and the other end of the resilient component contacts with the base.

20 Claims, 15 Drawing Sheets

FIXING MECHANISM FOR FIXING A BOARD AND ELECTRONIC DEVICE THEREWITH

BACKGROUND OF THE INVENTION

1. Field of the Invention

The present invention relates to a fixing mechanism for fixing a board and an electronic device therewith, and more particularly, to a fixing mechanism for fixing a board by an engagement of a resilient component and an engaging component and a related electronic device therewith.

2. Description of the Prior Art

A portable computer, such as a notebook computer, a tablet computer and so on, is widely used in daily life. Since the portable computer has advantages of small size and light weight, it is easy to carry about to deal with documents. Recently, wireless transmission technology has been well-developed. An antenna can be installed on the portable computer for data transmission without cable connection. Generally speaking, a wireless network card can be installed inside the portable computer for transmitting corresponding wireless signals. In addition, screws or hooks are often used for fixing the wireless network card during assembly process. However, since the wireless network card needs to be detached and assembled frequently, the hooks are easy to be broken when the wireless network card is detached due to improper structural design thereof, and screw bosses are easy to be broken as well when the screws are screwed and detached on the screw bosses frequently. Accordingly, it decreases yield rate and stability of product.

SUMMARY OF THE INVENTION

The present invention provides a fixing mechanism for fixing a board by an engagement of a resilient component and an engaging component and a related electronic device for solving above drawbacks.

According to the present invention, a fixing mechanism for fixing a board includes a bottom plate, a base and an engaging component. The base is installed on the bottom plate. The engaging component is installed on the base in a rotatable manner for engaging a side of the board, and the engaging component includes a main body, a pivoting portion, a hook portion, a handle portion and a pin portion. The pivoting portion is connected to an end of the main body and pivoted to the base. The hook portion is connected to another end of the main body for hooking the side of the board. The handle portion is connected to another end of the main body for driving the hook portion to separate from the side of the board. The pin portion is installed on a side of the main body. The fixing mechanism further includes a resilient component sheathing with the pin portion for driving the engaging component to pivot relative to the base. An end of the resilient component contacts with the main body and the other end of the resilient component contacts with the base.

According to the present invention, an electronic board includes a board and a fixing mechanism. The fixing mechanism is for fixing the board and includes a bottom plate, a base and an engaging component. The base is installed on the bottom plate. The engaging component is installed on the base in a rotatable manner for engaging a side of the board, and the engaging component includes a main body, a pivoting portion, a hook portion, a handle portion and a pin portion. The pivoting portion is connected to an end of the main body and pivoted to the base. The hook portion is connected to another end of the main body for hooking the side of the board. The handle portion is connected to another end of the main body for driving the hook portion to separate from the side of the board. The pin portion is installed on a side of the main body. The fixing mechanism further includes a resilient component sheathing with the pin portion for driving the engaging component to pivot relative to the base. An end of the resilient component contacts with the main body and the other end of the resilient component contacts with the base.

These and other objectives of the present invention will no doubt become obvious to those of ordinary skill in the art after reading the following detailed description of the embodiment that is illustrated in the various figures and drawings.

DETAILED DESCRIPTION

The present invention provides a fixing mechanism for fixing a board. The fixing mechanism includes a bottom plate, a base and an engaging component. The base is installed on the bottom plate. The engaging component is installed on the base in a rotatable manner for engaging a side of the board, and the engaging component includes a main body, a pivoting portion, a hook portion, a handle portion and a pin portion. The pivoting portion is connected to an end of the main body and pivoted to the base. The hook portion is connected to another end of the main body for hooking the side of the board. The handle portion is connected to another end of the main body for driving the hook portion to separate from the side of the board. The pin portion is installed on a side of the main body. The fixing mechanism further includes a resilient component sheathing with the pin portion. An end of the resilient component contacts with the main body and the other end of the resilient component contacts with the base. The resilient component is used for driving the engaging component to pivot relative to the base. Accordingly, the board is fixed on the bottom plate by the resilient component and the engaging component for enhancing convenience in use.

Furthermore, the present invention provides an electronic device including a board and a fixing mechanism. The fixing mechanism is for fixing the board and includes a bottom plate, a base and an engaging component. The base is installed on the bottom plate. The engaging component is installed on the base in a rotatable manner for engaging a side of the board, and the engaging component includes a main body, a pivoting portion, a hook portion, a handle portion and a pin portion. The pivoting portion is connected to an end of the main body and pivoted to the base. The hook portion is connected to another end of the main body for hooking the side of the board. The handle portion is connected to another end of the main body for driving the hook portion to separate from the side of the board. The pin portion is installed on a side of the main body. The fixing mechanism further includes a resilient component sheathing with the pin portion. An end of the resilient component contacts with the main body and the other end of the resilient component contacts with the base. The resilient component is used for driving the engaging component to pivot relative to the base. Accordingly, the board is fixed on the bottom plate by the resilient component and the engaging component for enhancing convenience in use.

Figure 1:
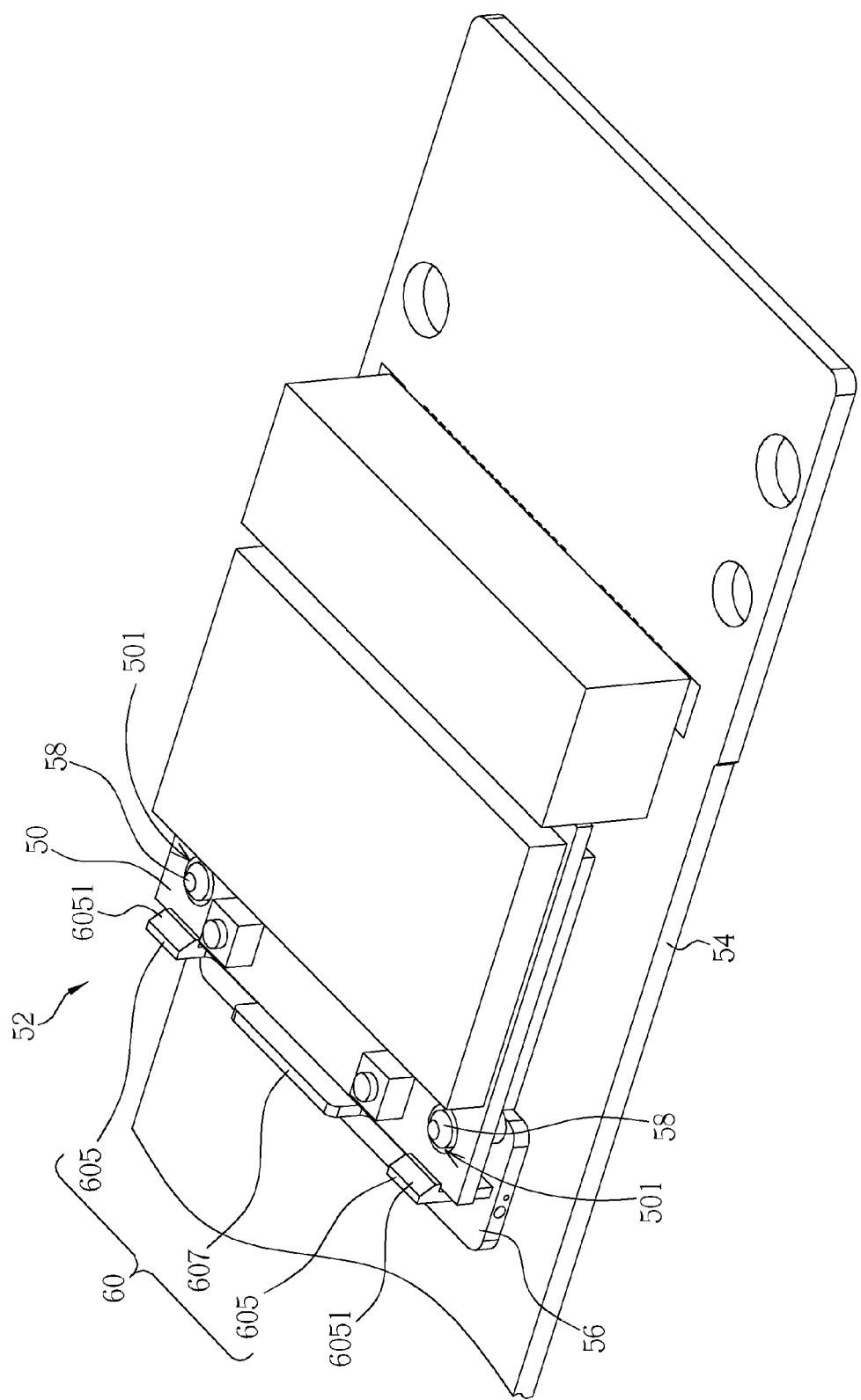
FIG. 1 and FIG. 2 are respectively diagrams of a fixing mechanism for fixing a board in different views according to a first embodiment of the present invention.
Figure 2:
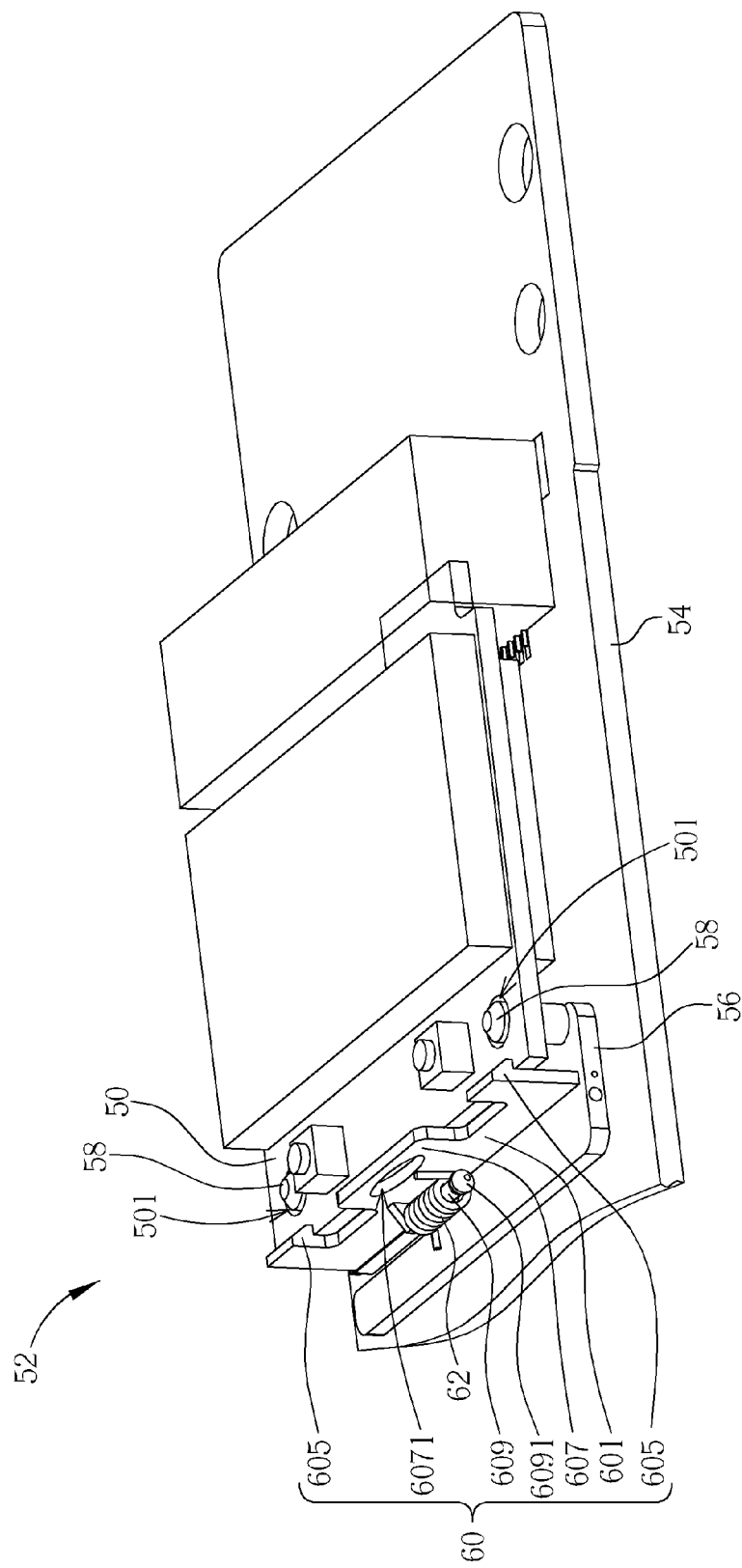
Figure 3:
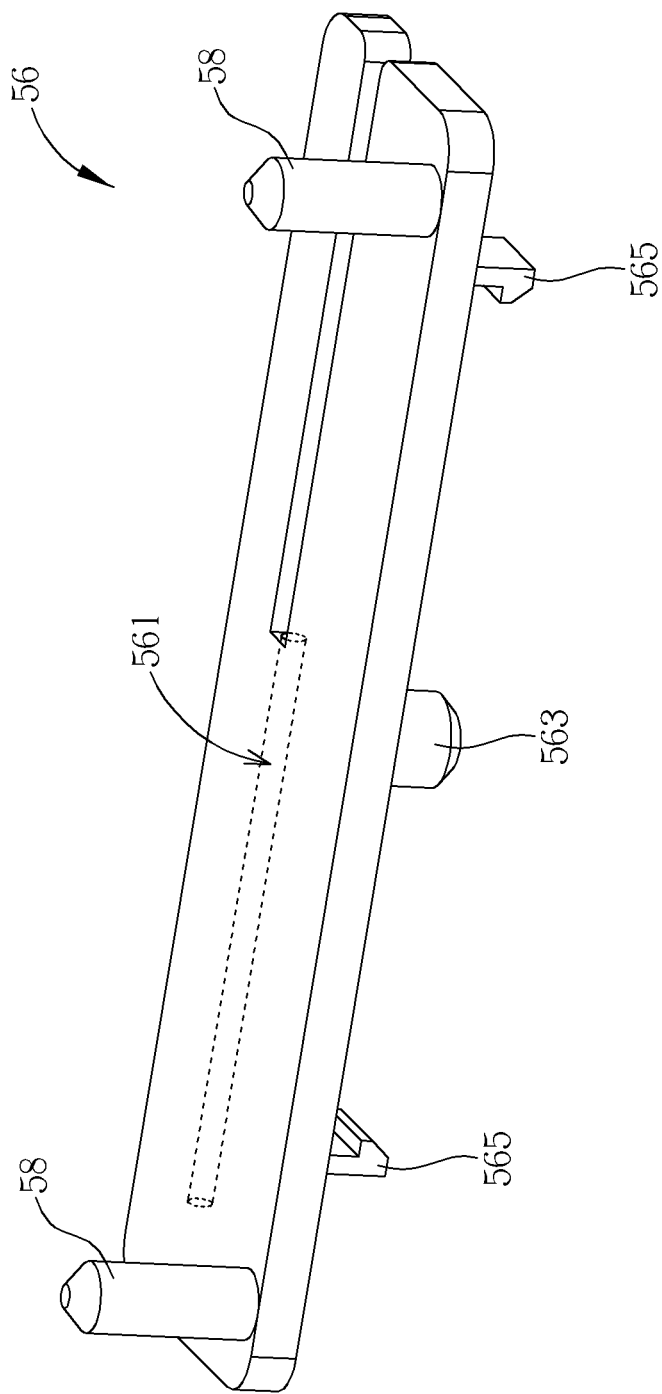
FIG. 3 is a diagram of a base according to the first embodiment of the present invention.

Please refer to FIG. 1 and FIG. 2. FIG. 1 and FIG. 2 are respectively diagrams of a fixing mechanism 52 for fixing a board 50 in different views according to a first embodiment of the present invention. The board 50 can be a wireless network card, such as a Wireless Local Area Network (WLAN) card, a Wireless Wide Area Network (WWAN) card and so on. The board 50 can be installed inside an electronic device, such as a notebook computer. The fixing mechanism 52 includes a bottom plate 54. The bottom plate 54 can be a circuit board, such as a printed circuit board, and an antenna printed circuit can be disposed on the bottom plate 54 for receiving and transmitting wireless signals. The fixing mechanism 52 further includes a base 56 installed on the bottom plate 54. Please refer to FIG. 3. FIG. 3 is a diagram of the base 56 according to the first embodiment of the present invention. A positioning slot 561, a positioning pin 563 and two hooks 565 are formed on the base 56. The positioning pin 563 and the two hooks 565 are used for fixing the base 56 on the bottom plate 54. The mechanism to fix the base 56 on the bottom plate 54 is not limited to use those components mentioned above. In addition, the fixing mechanism 52 further includes at least one positioning post 58 installed on the base 56. The positioning post 58 is used for inserting into a hole 501 on the board 50, and the positioning post 58 and the base 56 can be integrally formed. In this embodiment, the fixing mechanism 52 includes two positioning posts 58 disposed on two ends of the base 56, respectively. It should be noticed that an amount and disposal position of the positioning post 58 are not limited to those mentioned in this embodiment, and it depends on practical demands.

Figure 4:
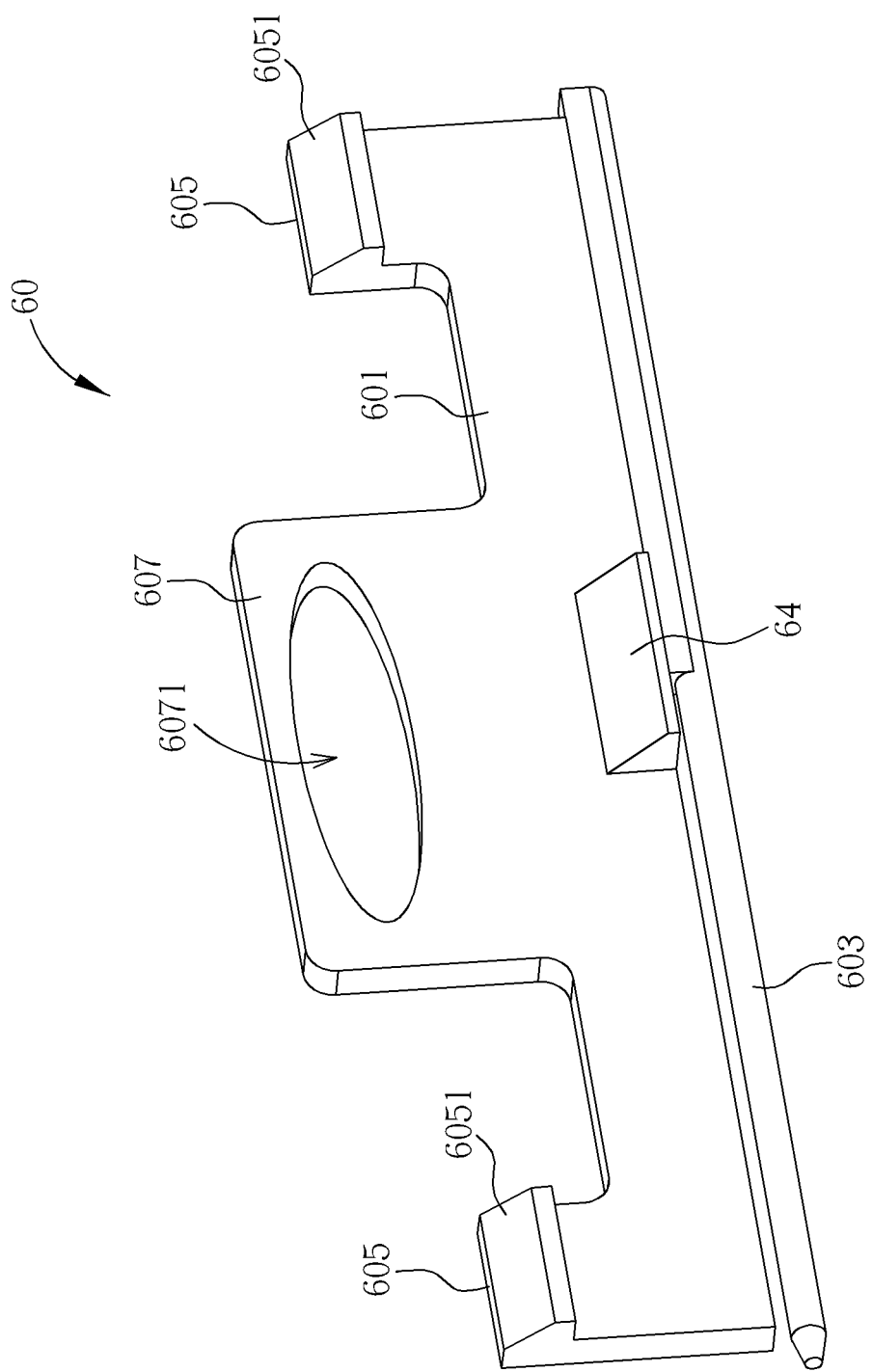
FIG. 4 and FIG. 5 are respectively diagrams of an engaging component in different views according to the first embodiment of the present invention.
Figure 5:
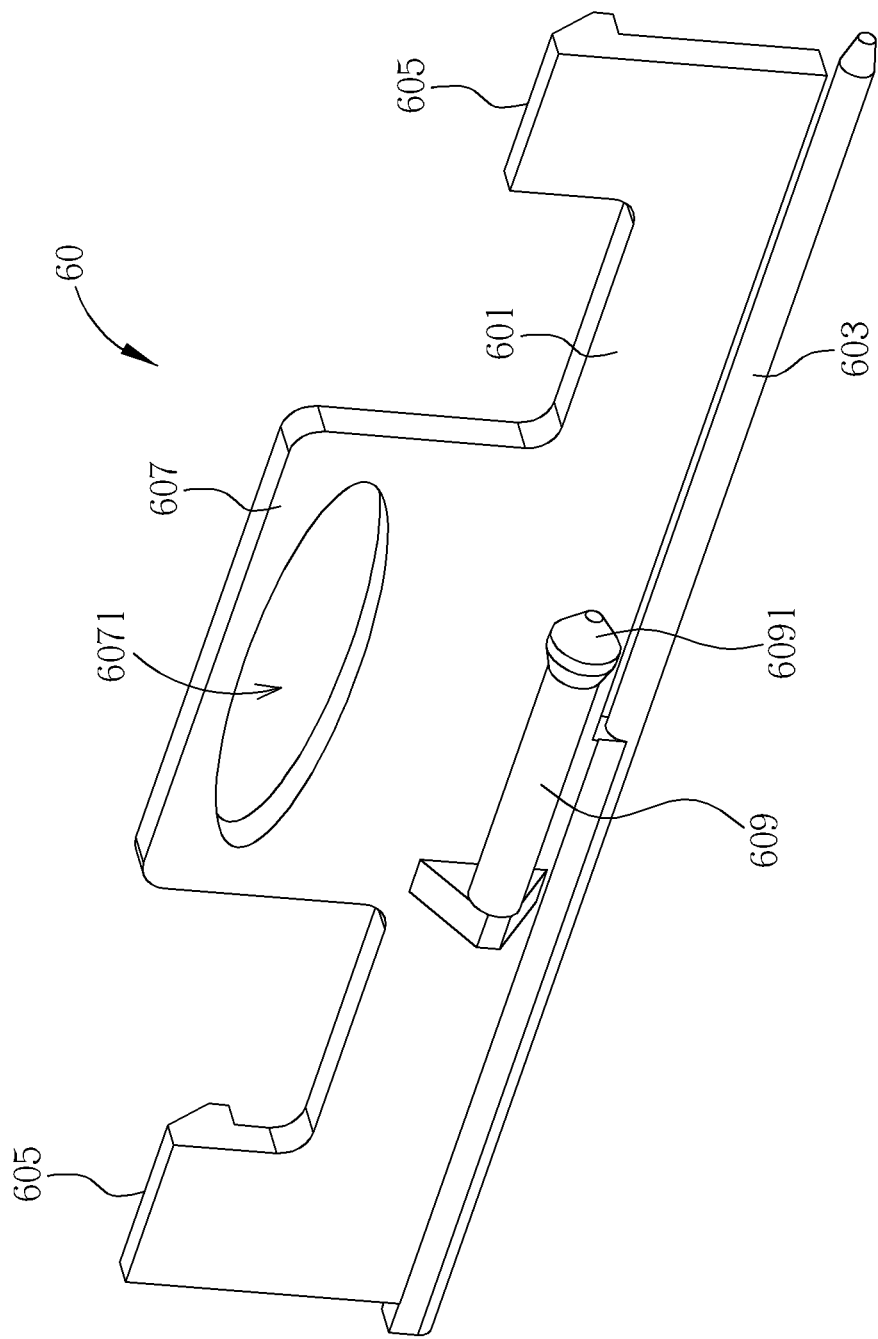

The fixing mechanism 52 further includes an engaging component 60 installed on the base 56 in a rotatable manner for engaging a side of the board 50. Please refer to FIG. 4 and FIG. 5. FIG. 4 and FIG. 5 are respectively diagrams of the engaging component 60 in different views according to the first embodiment of the present invention. The engaging component 60 includes a main body 601, a pivoting portion 603, at least one hook portion 605, a handle portion 607 and a pin portion 609. The main body 601, the pivoting portion 603, the hook portion 605, the handle portion 607 and the pin portion 609 can be, but not limited to, integrally formed. The pivoting portion 603 is connected to an end of the main body 601 and pivoted to the base 56. In this embodiment, the pivoting portion 603 can be a positioning pin disposed through the positioning slot 561 on the base 56 for pivoting the engaging component 60 on the base 56. The hook portion 605 is connected to another end of the main body 601 for hooking the side of the board 50. In this embodiment, the engaging component 60 includes two hook portions 605 respectively disposed on the two sides of the main body 601. It should be noticed that an amount and disposal position of the hook portions 605 are not limited to those mentioned in this embodiment, and it depends on practical demands. Furthermore, an inclined structure 6051 is formed on a side of each hook portion 605 for guiding the side of the board 50 to be pressed down. The handle portion 607 is connected to another end of the main body 601 for driving the hook portion 605 to separate from the side of the board 50. An opening 6071 is formed on the handle portion 607 for providing a user's fingers with a place to apply force.

Figure 6:
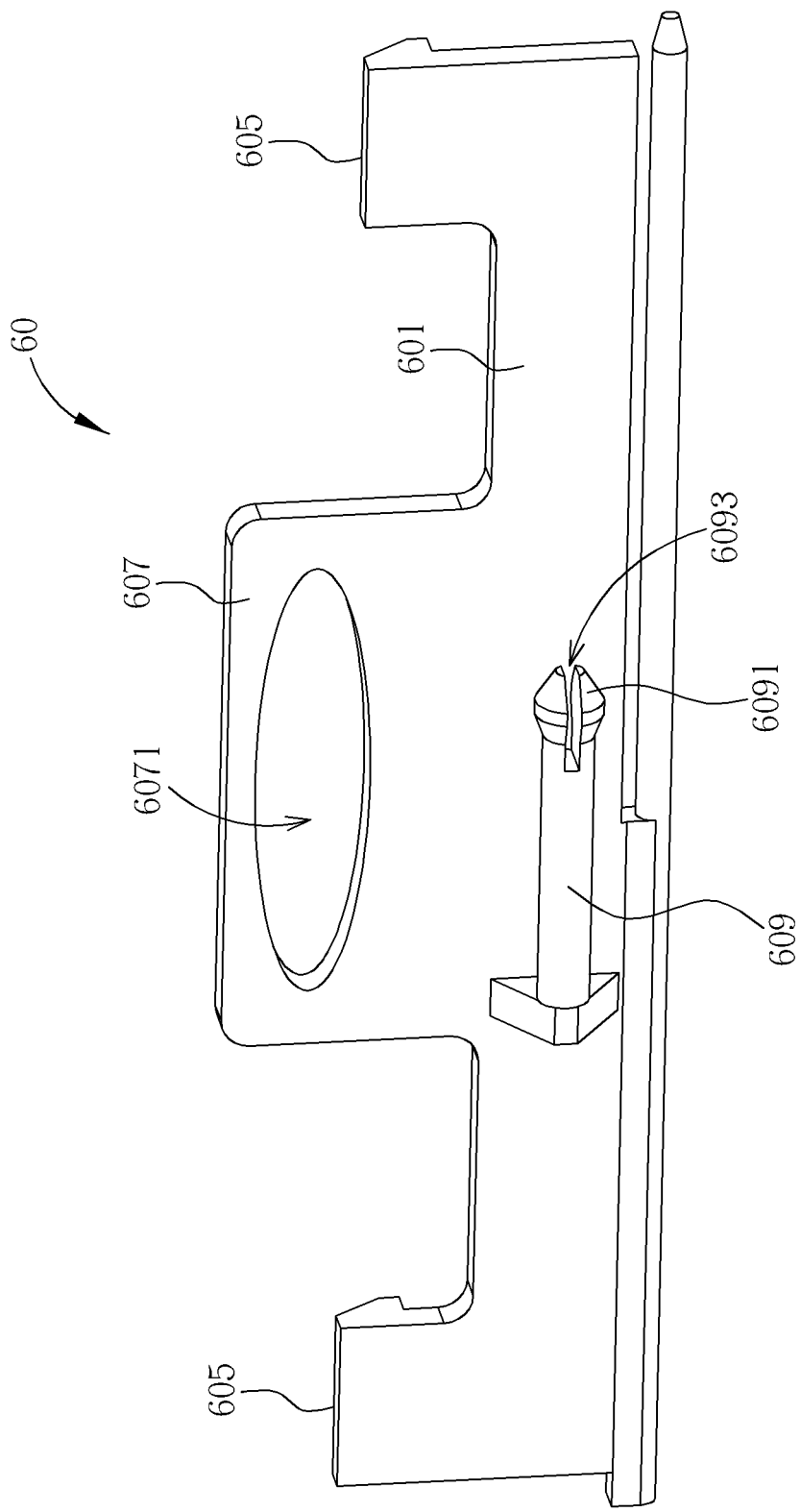
FIG. 6 is a diagram of the engaging component according to another embodiment of the present invention.

The pin portion 609 is installed on a side of the main body 601. A protruding structure 6091 is disposed an end of the pin portion 609. As shown in FIG. 2, the fixing mechanism 52 further includes a resilient component 62 sheathing with the pin portion 609, and the protruding structure 6091 can prevent the resilient component 62 from separating from the pin portion 609. An end of the resilient component 62 contacts with the base 56, and the resilient component 62 is used for driving the engaging component 60 to pivot relative to the base 56. In this embodiment, the resilient component 62 can be a spring. Please refer to FIG. 6. FIG. 6 is a diagram of the engaging component 60 according to another embodiment of the present invention. A slot 6093 is formed on the protruding structure 6091 of the pin portion 609. In such a manner, the protruding structure 6091 can be easily deformed and pressed inwardly by the slot 6093 of the protruding structure 6091, so as to facilitate the resilient component 62 to pass through the protruding structure 6091 for assembly.

Figure 7:
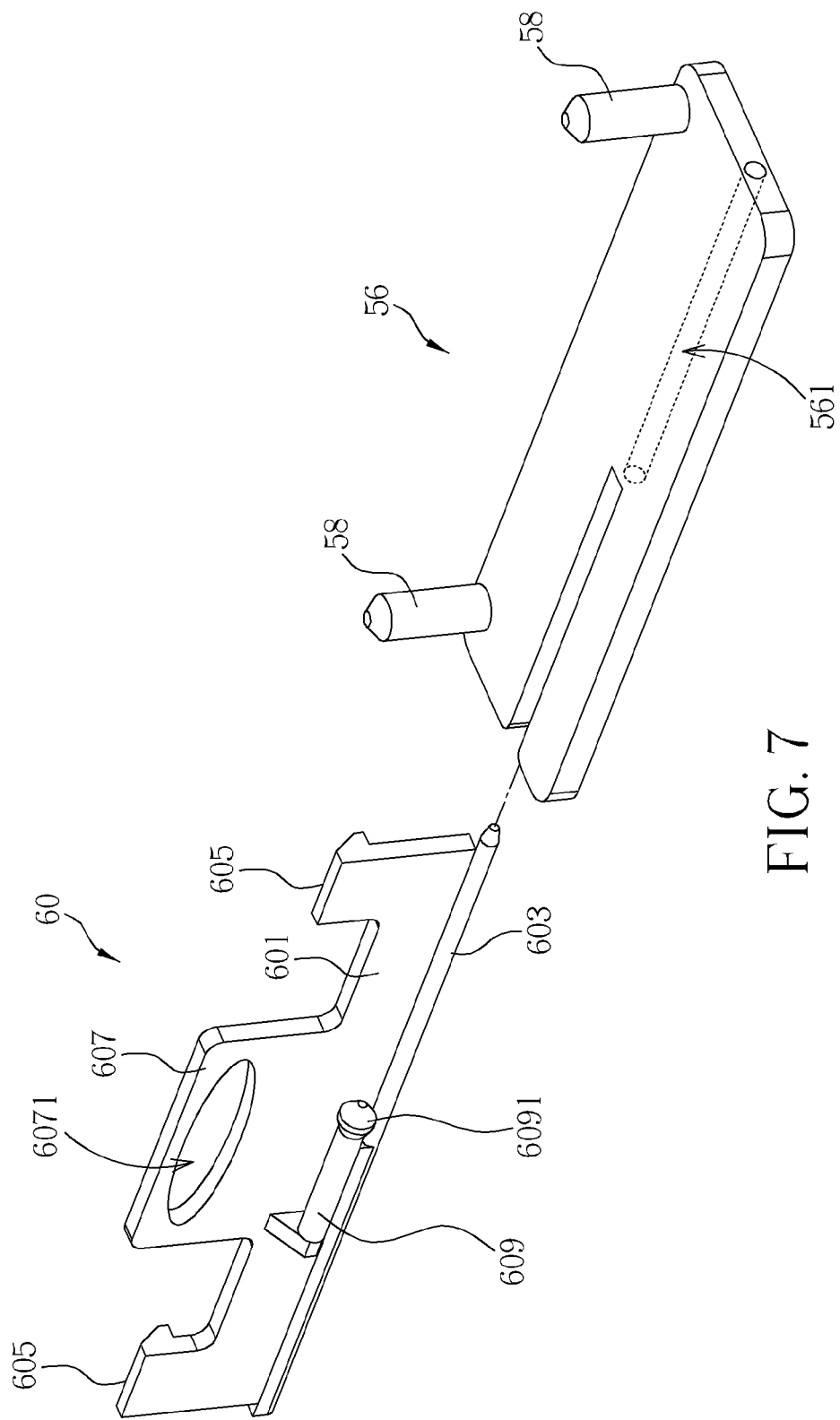
FIG. 7 to FIG. 10 are assembly diagrams of the fixing mechanism and the board according to the first embodiment of the present invention.
Figure 8:
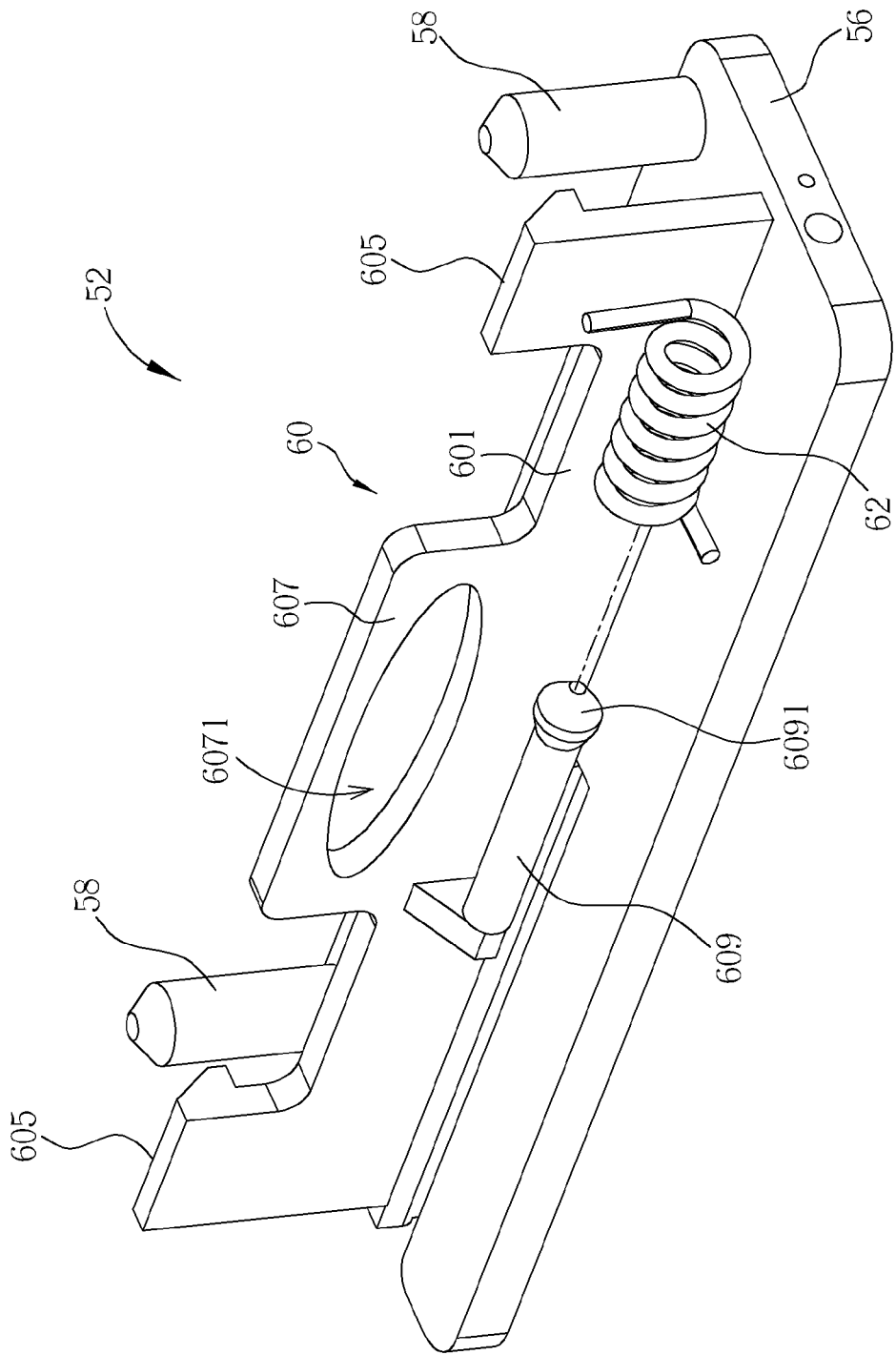
Figure 9:
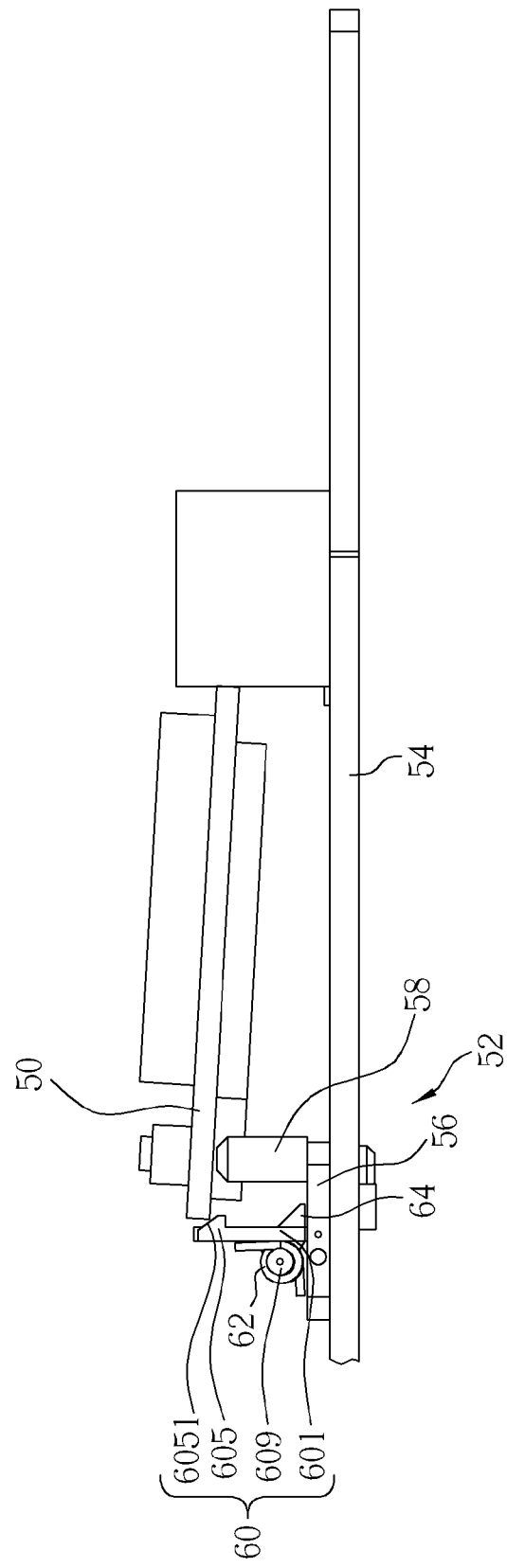

Please refer to FIG. 7 to FIG. 10. FIG. 7 to FIG. 10 are assembly diagrams of the fixing mechanism 52 and the board 50 according to the first embodiment of the present invention. As shown in FIG. 7, the pivoting portion 603 of the engaging component 60 can be inserted into the positioning slot 561 on the base 56 for pivoting the engaging component 60 on the base 56. Then, as shown in FIG. 8, the resilient component 62 is sheathed with the pin portion 609 with an end contacting with the main body 601 and with the other end contacting with the base 56. It should be noticed that the protruding structure 6091 of the pin portion 609 can prevent the resilient component 62 from separating from the pin portion 609. Afterwards, an assembly of the engaging component 60, the resilient component 62 and the base 56 can be installed on the bottom plate 54. Then, as shown in FIG. 9, another side of the board 50 can be slanted and inserted into a connecting socket on the bottom plate 54. Accordingly, signals can be transmitted between the board 50 and the bottom plate 54, i.e. the bottom plate 54 is a circuit board. Afterwards, the side of the board 50 is pressed, such that the side of the board 50 drives the engaging component 60 to pivot relative to the base 56 as the side of the board 50 slides on the inclined structure 6051. In the meanwhile, the engaging component 60 simultaneously pushes the end of the resilient component 62 to deform the resilient component 62.

Figure 10:
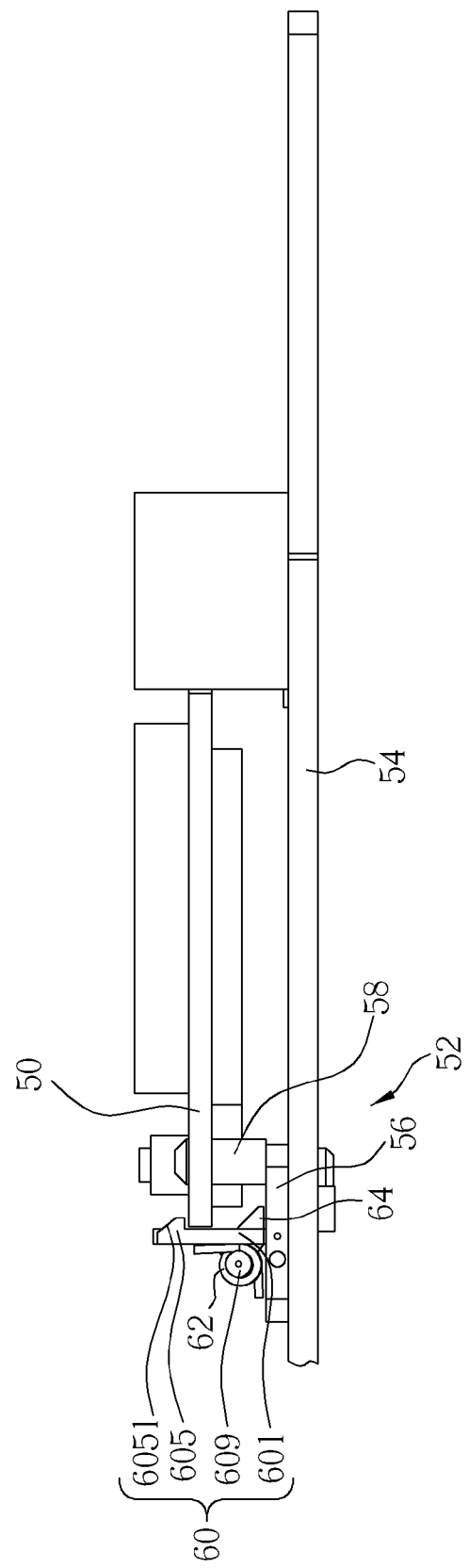

As shown in FIG. 10, when the side of the board 50 slides relative to the inclined structure 6051 to separate from the inclined structure 6051, the board 50 can not push the hook portions 605. Accordingly, the resilient component 62 can provide the engaging component 60 with a resilient force, so as to drive the engaging component 60 to pivot relative to the base 56. As a result, the hook portions 605 can hook the side of the board 50. In the meanwhile, the board 50 can be stably installed on the bottom plate 54. In addition, the fixing mechanism 52 further includes a stopping component 64 connected to another side of the main body 601 of the engaging component 60. When the resilient component 62 provides the resilient force to the engaging component 60 for driving the engaging component 60 to pivot relative to the base 56, the stopping component 64 can be used for stopping the main body 601, so as to prevent the main body 601 from being over-pushed and falling due to being driven by the resilient force provided by the resilient component 62. The stopping component 64 can be selectively installed on the base 56 for stopping another side of the main body 601. When the board 50 is desired to be detached, the handle portion 607 of the engaging component 60 is pushed, such that the engaging component 60 is pivoted to the base 56 and the hook portion 605 separates from the side of the board 50. The opening 6071 on the handle portion 607 can provide a place for the user's finger to push the handle portion 607. Afterwards, another side of the board 50 can be pulled out of the connecting socket on the bottom plate 54, so as to complete detachment of the board 50.

Figure 11:
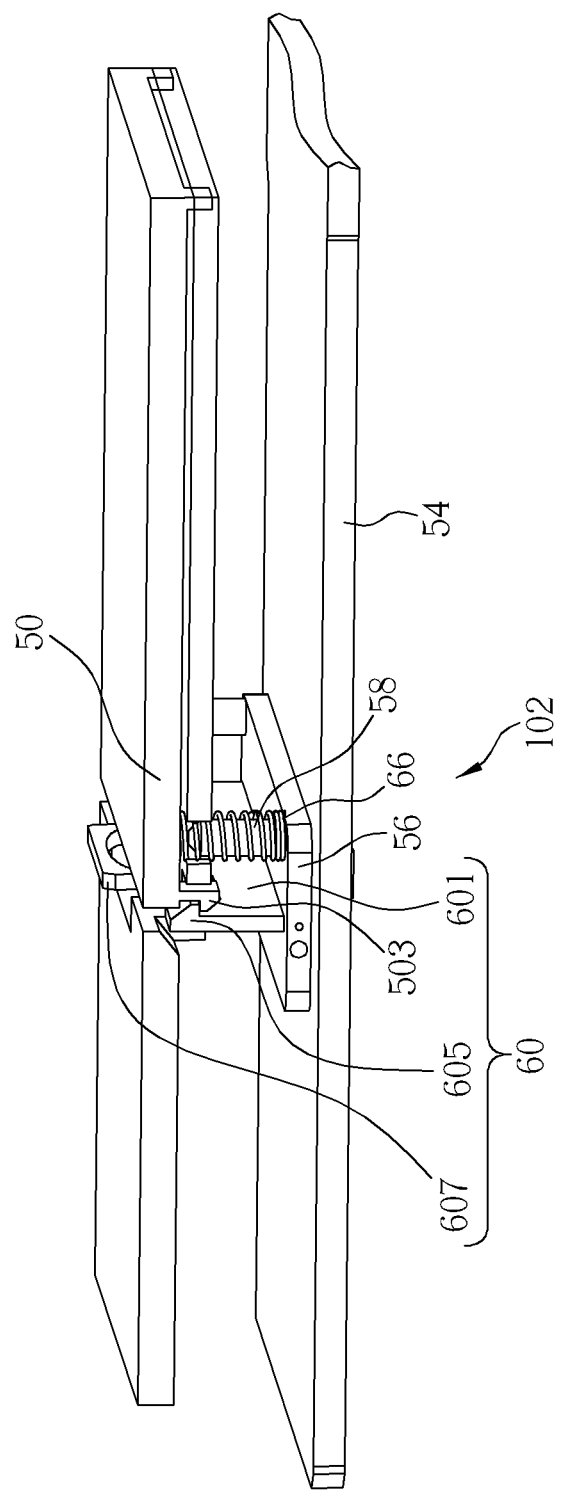
FIG. 11 is a diagram of a fixing mechanism for fixing the board according to a second embodiment of the present invention.
Figure 12:
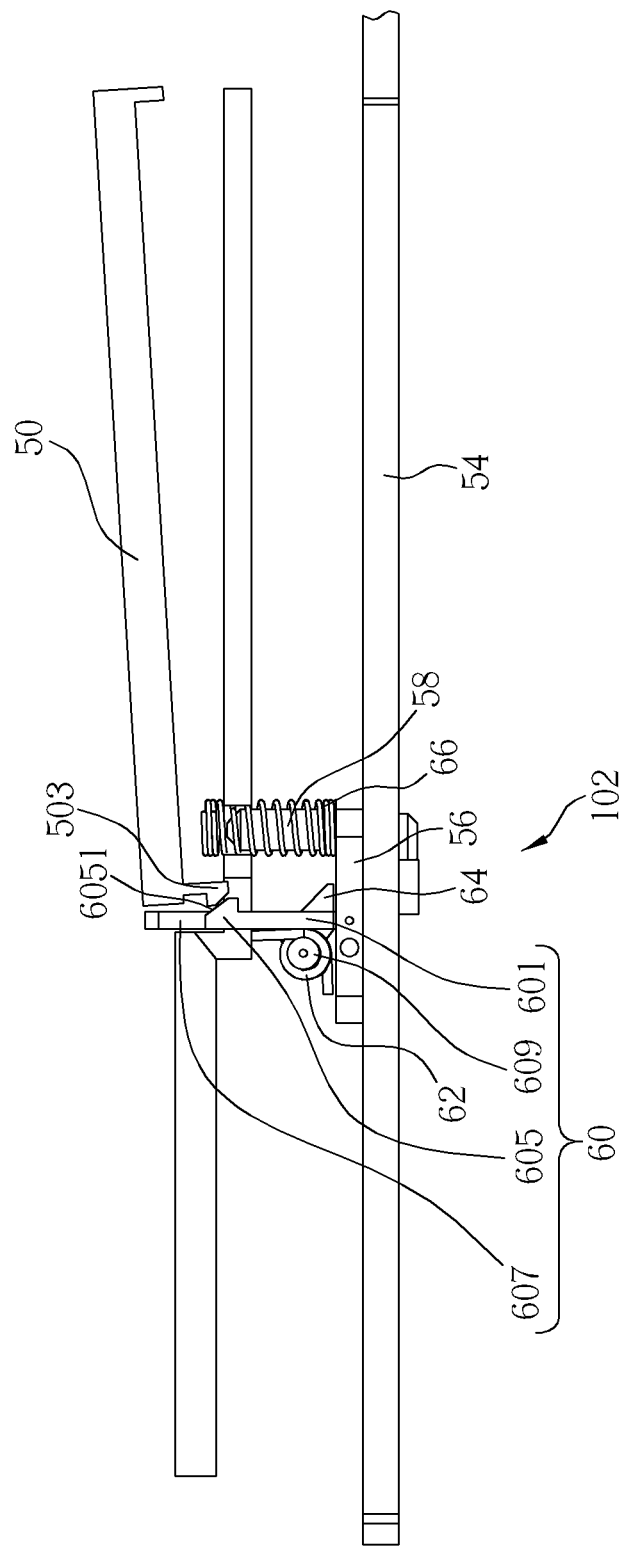
FIG. 12 and FIG. 13 are assembly diagrams illustrating that the board is installed on the fixing mechanism according to the second embodiment of the present invention.
Figure 13:
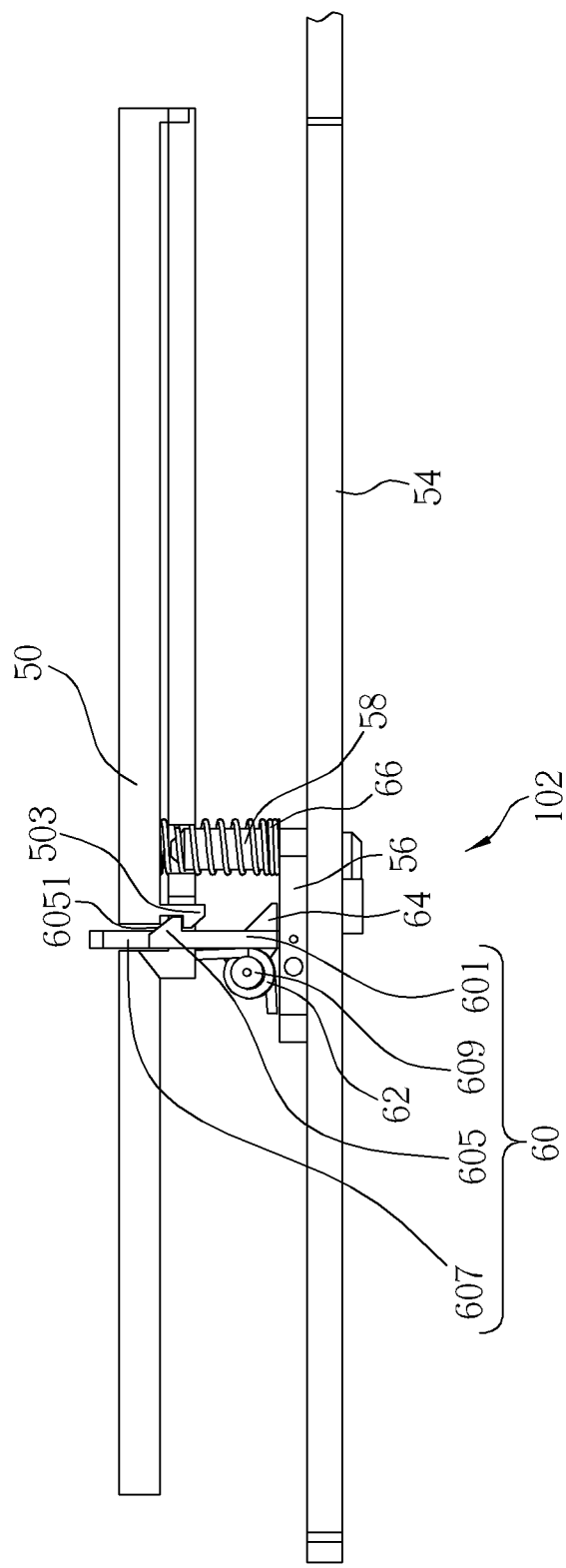
Figure 14:
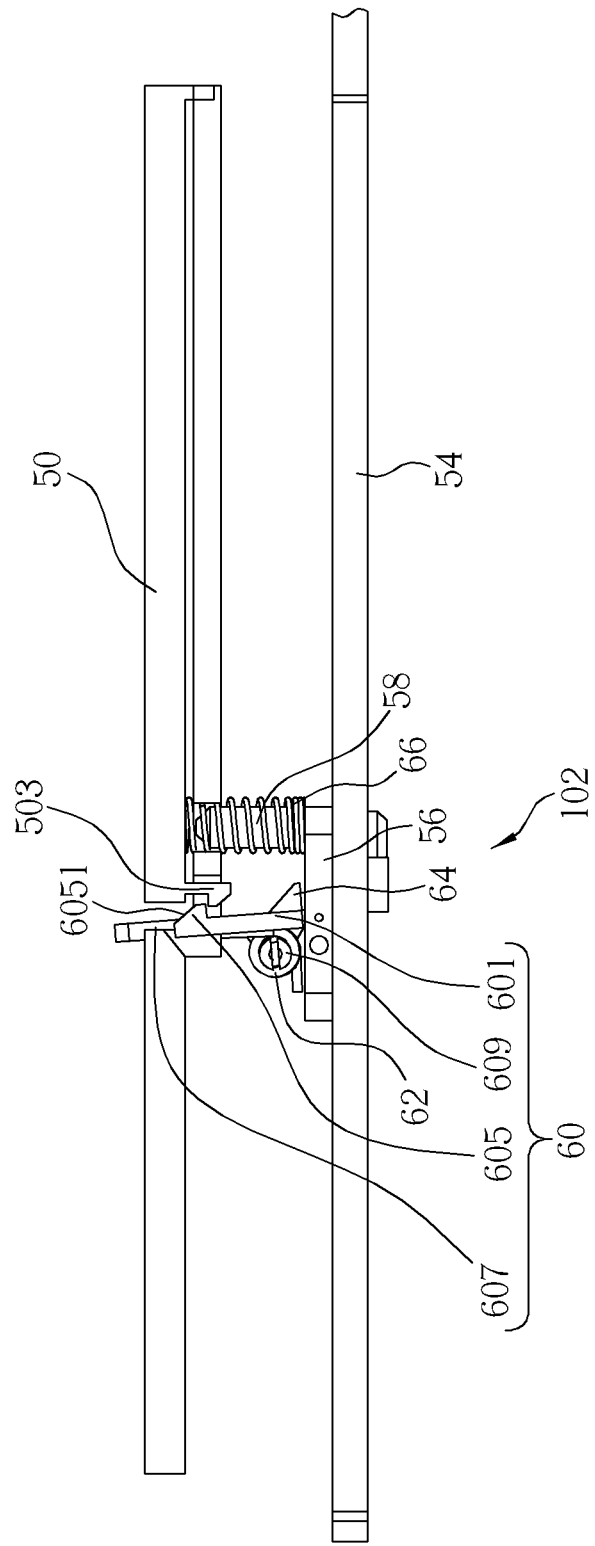
FIG. 14 and FIG. 15 are diagrams illustrating that the board is detached from the fixing mechanism according to the second embodiment of the present invention.
Figure 15:
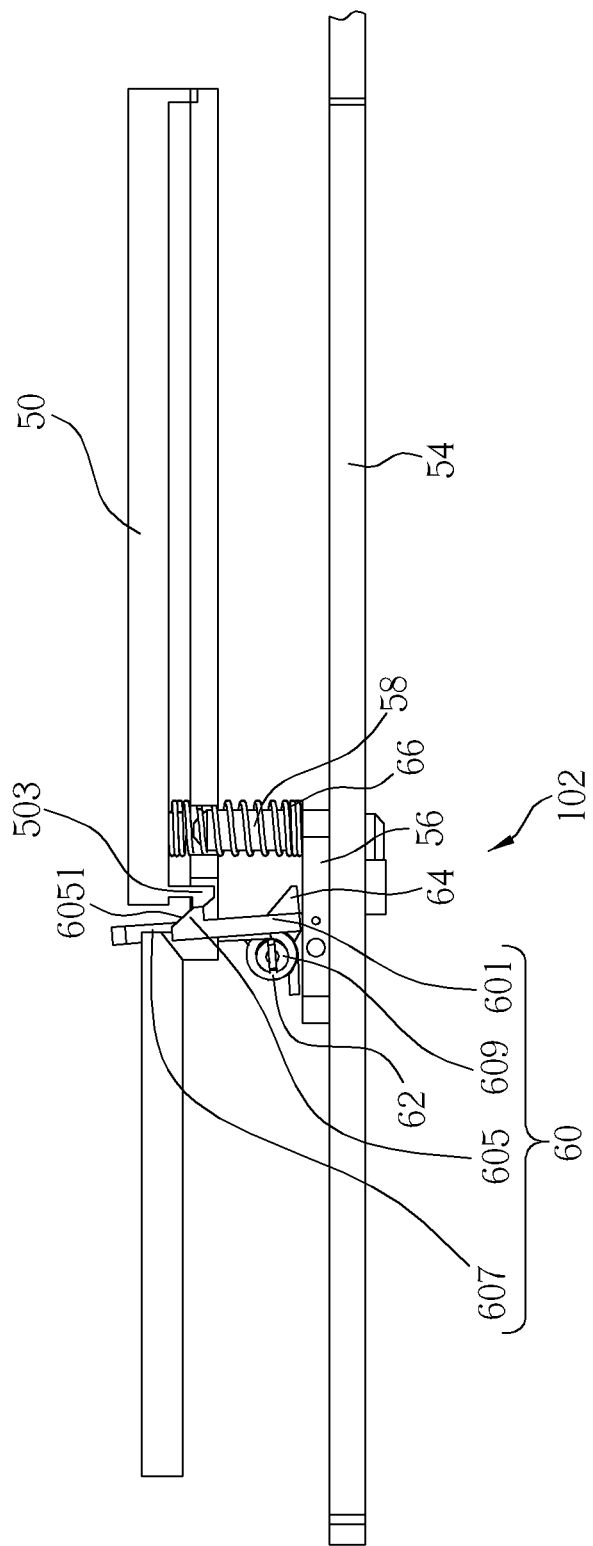

Please refer to FIG. 11 to FIG. 15. FIG. 11 is a diagram of a fixing mechanism 102 for fixing the board 50 according to a second embodiment of the present invention. FIG. 12 and FIG. 13 are assembly diagrams illustrating that the board 50 is installed on the fixing mechanism 102 according to the second embodiment of the present invention. FIG. 14 and FIG. 15 are diagrams illustrating that the board 50 is detached from the fixing mechanism 102 according to the second embodiment of the present invention. It should be noticed that components with the same denotes in the first embodiment and in the second embodiment have the same structures and functions, and further description is omitted herein for simplicity. The main difference between the second embodiment and the first embodiment is that the board 50 can be a cap cover, and the bottom plate 54 can be a casing in the second embodiment. For example, the bottom plate 54 can be a bottom casing of an electronic device, such as a notebook computer, and the board 50 can be a cap cover installed on the bottom casing in a detachable manner for covering components, such as a memory, a battery and so on. Furthermore, the fixing mechanism 102 further includes at least one resilient element 66 sheathing with the positioning post 58 and abutting against the board 50. In this embodiment, the resilient element 66 can be a spring. The resilient element 66 can push the board 50 when the hook portion 605 separates from the side of the board 50. In this embodiment, the board 50 can include a hook component 503 for engaging with the hook component 503 of the board 50. The resilient element 66 can push the board 50 as the hook portion 605 separates from the hook component 503 of the board 50.

When the board 50 is installed on the bottom plate 54, the side of the board 50 can be pressed, such that the hook component 503 of the board 50 slides on the inclined structure 6051 of the hook portion 605 and pushes the engaging component 60 to be pivoted to the base 56, as shown in FIG. 12. In the meanwhile, the engaging component 60 pushes the end of the resilient component 62, so as to deform the resilient component 62. As shown in FIG. 13, when the hook component 503 of the board 50 slides relative to the inclined structure 6051 on the hook portion 605 to separate from the inclined structure 6051, the board 50 can not push the hook portion 605. Accordingly, the resilient component 62 can provide the engaging component 60 with the resilient force, so as to drive the engaging component 60 to pivot relative to the base 56. As a result, the hook portions 605 can hook the hook component 503 of the board 50. In the meanwhile, the board 50 can be stably installed on the bottom plate 54, and the resilient element 66 is in a resiliently deformed status. Similarly, when the resilient component 62 provides the engaging component 60 with the resilient force to drive the engaging component 60 to pivot relative to the base 56, the stopping component 64 can be used for stopping the main body 601, so as to prevent the main body 601 from being over-pushed and falling due to being driven by the resilient force provided by the resilient component 62.

As shown in FIG. 14, when the board 50 is desired to be detached, the handle portion 607 of the engaging component 60 can be pushed, such that the engaging component 60 pivots relative to the base 56, and the opening 6071 on the handle portion 607 can provide a place for the user's finger to push the handle portion 607. As shown in FIG. 15, when the engaging component 60 pivots relative to the base 56 to a position that the hook portion 605 separates from the hook component 503 of the board 50, the resilient element 66 can provide the board 50 with a resilient force, so as to push the board 50 upwardly. In such a manner, the board 50 can be pulled upwardly, so as to complete the detachment of the board 50. It should be noticed that implementation of the board 50 and the bottom plate 54 is not limited to those mentioned in the aforesaid embodiments, and it depends on practical demands.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing mechanism for fixing a board, the fixing mechanism comprising:
   a bottom plate;
   a base installed on the bottom plate;
   an engaging component installed on the base in a rotatable manner for engaging a side of the board, the engaging component comprising:
      a main body;
      a pivoting portion connected to an end of the main body and pivoted to the base;
      a hook portion connected to another end of the main body for hooking the side of the board;
      a handle portion connected to the another end of the main body for driving the hook portion to separate from the side of the board; and
      a pin portion installed on a side of the main body; and
   a resilient component sheathing with the pin portion for driving the engaging component to pivot relative to the base, an end of the resilient component contacting with the main body and the other end of the resilient component contacting with the base.

2. The fixing mechanism of claim 1, wherein an inclined structure is formed on a side of the hook portion for guiding the side of the board to be pressed down.

3. The fixing mechanism of claim 2, wherein the side of the board drives the engaging component to pivot relative to the base as the side of the board slides on the inclined structure, and the engaging component simultaneously pushes the end of the resilient component to deform the resilient component.

4. The fixing mechanism of claim 3, wherein the resilient component drives the engaging component to pivot relative to the base as the side of the board separates from the inclined structure, such that the hook portion hooks the side of the board.

5. The fixing mechanism of claim 1, further comprising a stopping component connected to another side of the main body of the engaging component or installed on the base for stopping the main body as the resilient component drives the engaging component to pivot relative to the base.

6. The fixing mechanism of claim 1, wherein a positioning slot is formed on the base, and the pivoting portion is a positioning pin disposed through the positioning slot.

7. The fixing mechanism of claim 1, further comprising a positioning post installed on the base for inserting into a hole of the board as the hook portion hooks the side of the board.

8. The fixing mechanism of claim 7, further comprising a resilient element sheathing with the positioning post and abutting against the board for pushing the board as the hook portion separates from the side of the board.

9. The fixing mechanism of claim 8, wherein the hook portion is for engaging with a hook component of the board, and the resilient element pushes the board as the hook portion separates from the hook component of the board.

10. The fixing mechanism of claim 9, wherein the board is a cap cover, and the bottom plate is a casing.

11. The fixing mechanism of claim 1, wherein an opening is formed on the handle portion.

12. The fixing mechanism of claim 1, wherein a protruding structure is disposed an end of the pin portion for preventing the resilient component from separating from the pin portion.

13. The fixing mechanism of claim 12, wherein a slot is formed on the protruding structure.

14. The fixing mechanism of claim 1, wherein the board is a board body of a wireless network card, and the bottom plate is a circuit board.

15. An electronic device, comprising:
   a board; and
   a fixing mechanism for fixing the board, comprising:
      a bottom plate;
      a base installed on the bottom plate;
      an engaging component installed on the base in a rotatable manner for engaging a side of the board, the engaging component comprising:
         a main body;
         a pivoting portion connected to an end of the main body and pivoted to the base;
         a hook portion connected to another end of the main body for hooking the side of the board;
         a handle portion connected to the another end of the main body for driving the hook portion to separate from the side of the board; and
         a pin portion installed on a side of the main body; and
      a resilient component sheathing with the pin portion for driving the engaging component to pivot relative to the base, an end of the resilient component contacting with the main body and the other end of the resilient component contacting with the base.

16. The electronic device of claim 15, wherein an inclined structure is formed on a side of the hook portion for guiding the side of the board to be pressed down, the side of the board drives the engaging component to pivot relative to the base as the side of the board slides on the inclined structure, and the engaging component simultaneously pushes the end of the resilient component to deform the resilient component, and the resilient component drives the engaging component to pivot relative to the base as the side of the board separates from the inclined structure, such that the hook portion hooks the side of the board.

17. The electronic device of claim 15, further comprising a stopping component connected to another side of the main body of the engaging component or installed on the base for stopping the main body as the resilient component drives the engaging component to pivot relative to the base.

18. The electronic device of claim 15, wherein a positioning slot is formed on the base, and the pivoting portion is a positioning pin disposed through the positioning slot.

19. The electronic device of claim 15, further comprising a positioning post installed on the base for inserting into a hole of the board as the hook portion hooks the side of the board.

20. The electronic device of claim 19, further comprising a resilient element sheathing with the positioning post and abutting against the board for pushing the board as the hook portion separates from the side of the board, the board comprising a hook component for engaging with the hook portion, and the resilient element pushing the board as the hook portion separates from the hook component of the board.

* * * * *